United States Patent
Nadarajah

(10) Patent No.: US 7,810,122 B2
(45) Date of Patent: *Oct. 5, 2010

(54) APPLICATION SERVICES COORDINATED SATELLITE MULTICAST CONTENT DELIVERY

(75) Inventor: Dinesh Nadarajah, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 901 days.

This patent is subject to a terminal disclaimer.

(21) Appl. No.: 11/062,732

(22) Filed: Feb. 22, 2005

(65) Prior Publication Data

US 2005/0289629 A1 Dec. 29, 2005

Related U.S. Application Data

(63) Continuation-in-part of application No. 10/435,598, filed on May 9, 2003.

(60) Provisional application No. 60/546,900, filed on Feb. 23, 2004.

(51) Int. Cl.
- *H04N 7/173* (2006.01)
- *H04N 7/16* (2006.01)
- *H04N 7/20* (2006.01)
- *H04L 12/28* (2006.01)

(52) U.S. Cl. .......... 725/63; 725/118; 725/148; 370/237; 370/238; 370/248

(58) Field of Classification Search ............. 725/63–73, 725/98, 105, 109–133, 143–153; 455/12.1; 370/237–238, 248, 252, 254, 315–316, 351–431; 709/223–226

See application file for complete search history.

(56) References Cited

U.S. PATENT DOCUMENTS

| | | | |
|---|---|---|---|
| 5,758,293 A | 5/1998 | Frasier | |
| 6,061,451 A | 5/2000 | Muratani | |
| 6,118,976 A | 9/2000 | Arias et al. | |
| 6,195,692 B1 | 2/2001 | Hsu | |
| 6,330,670 B1 | 12/2001 | England | |
| 6,335,927 B1 | 1/2002 | Elliott | |
| 6,351,467 B1 | 2/2002 | Dillon | |
| 6,510,556 B1 | 1/2003 | Kusaba et al. | |
| 6,539,018 B1 * | 3/2003 | Huggins et al. | 370/395.51 |
| 6,724,737 B1 * | 4/2004 | Boyden et al. | 370/316 |
| 6,728,269 B1 * | 4/2004 | Godwin et al. | 725/35 |

(Continued)

OTHER PUBLICATIONS

International Search Report for International Application No. PCT/US04/12751, Mailed on Jun. 14, 2006.

(Continued)

*Primary Examiner*—Scott Beliveau
*Assistant Examiner*—Michael Telan
(74) *Attorney, Agent, or Firm*—Toler Law Group

(57) ABSTRACT

A method of distributing content includes receiving at least one request for a particular content item. Based on the at least one request, a number of users who are to receive the particular content item and are capable of receiving the particular content item via a wireless link is determined. Based on the number of users, at least one of a wireline link and the wireless link from which the users are to receive the particular content item is selected. The particular content item is distributed to the users via the selected at least one link.

13 Claims, 2 Drawing Sheets

U.S. PATENT DOCUMENTS

| | | | |
|---|---|---|---|
| 6,810,413 B1 * | 10/2004 | Rajakarunanayake et al. | 725/109 |
| 6,898,800 B2 | 5/2005 | Son | |
| 6,973,621 B2 * | 12/2005 | Sie et al. | 725/39 |
| 7,089,577 B1 | 8/2006 | Rakib et al. | |
| 2002/0003776 A1 | 1/2002 | Gokhale | |
| 2002/0006116 A1 | 1/2002 | Burkhart | |
| 2002/0058478 A1 | 5/2002 | de La Chapelle | |
| 2002/0069406 A1 * | 6/2002 | Aaltonen et al. | 725/34 |
| 2002/0124182 A1 | 9/2002 | Basco | |
| 2002/0131428 A1 | 9/2002 | Pecus | |
| 2002/0138842 A1 | 9/2002 | Chong et al. | |
| 2002/0184642 A1 | 12/2002 | Lude | |
| 2003/0003815 A1 * | 1/2003 | Yamada | 439/894 |
| 2003/0028890 A1 | 2/2003 | Swart et al. | |
| 2003/0070174 A1 | 4/2003 | Solomon | |
| 2004/0117860 A1 * | 6/2004 | Yi et al. | 725/147 |

OTHER PUBLICATIONS

Written Opinion of the International Searching Authority for International Application No. PCT/US04/12751, Mailed on Jun. 14, 2006.

* cited by examiner

APPLICATION SERVICES COORDINATED SATELLITE MULTICAST CONTENT DELIVERY

CROSS-REFERENCE TO RELATED APPLICATION(S)

The present application claims priority under 35 U.S.C. §119(e) to U.S. Provisional Patent Application No. 60/546,900, filed Feb. 23, 2004, entitled "SYSTEMS AND METHODS FOR AN FTTP NETWORK," which application is incorporated by reference herein in its entirety.

The present application is a continuation-in-part of and claims priority under 35 U.S.C. §120 to U.S. patent application Ser. No. 10/435,598, filed May 9, 2003, entitled "APPLICATION SERVICES COORDINATED DSL-SATELLITE MULTICAST CONTENT DELIVERY," which application is incorporated by reference herein its entirety.

BACKGROUND OF THE INVENTION

1. Field of the Invention

The present invention relates to methods and systems for delivering electronic content.

2. Description of the Related Art

As an increasing amount of digital content is being electronically distributed to end user locations, a greater need exists for multicast content delivery capabilities. In a multicast delivery, the same content (e.g. a video or a piece of subscription software) is addressed for distribution to multiple end user locations.

Satellites are well-suited for multicast content delivery. In particular, satellites are effective for distributing large quantities of data to multiple end user locations over a wide geographical area.

A current form of digital subscriber line (DSL) technology does not distribute internet protocol (IP) multicast content without implementing layer 3 routing at central offices. Without layer 3 routing, each piece of content is delivered via a respective unicast session. Using multiple unicast sessions can be resource intensive and can cause network congestion especially when transporting video and subscription software.

BRIEF DESCRIPTION OF THE DRAWINGS

The present invention is pointed out with particularity in the appended claims. However, other features are described in the following detailed description in conjunction with the accompanying drawing in which:

DETAILED DESCRIPTION OF THE PREFERRED EMBODIMENTS

Disclosed herein are methods and systems that provide a seamless integration between a broadband landline network and a wireless network such as a satellite network. The system dynamically configures the two networks for multicast content delivery to end users who have access to the two networks. Some content items may have a portion that is delivered via the broadband landline network and a remaining portion that is delivered via the satellite network.

Figure 1:
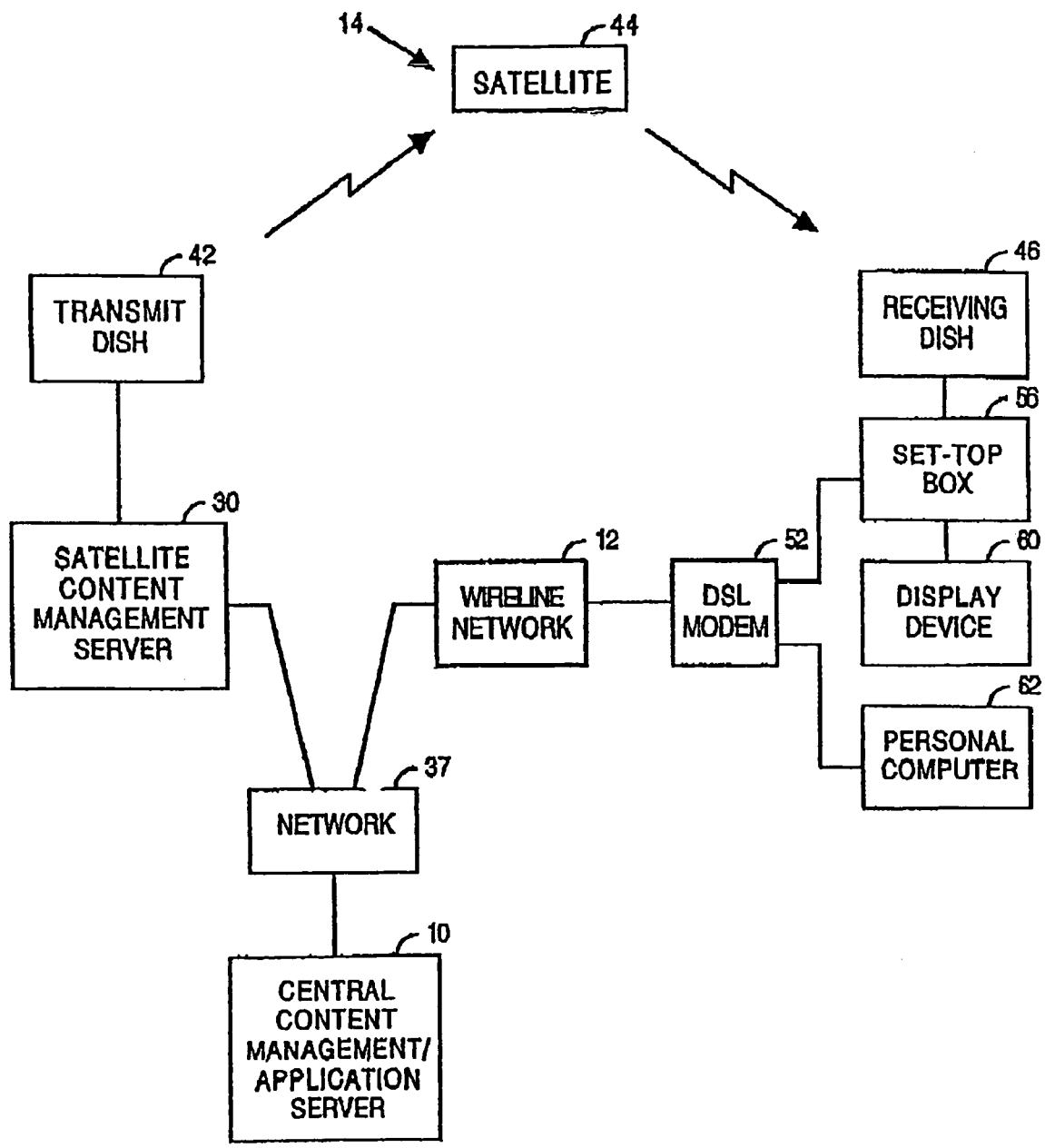
FIG. 1 is a block diagram of an embodiment of a content delivery system.

Embodiments of the present invention are described with reference to FIG. 1, which is a block diagram of an embodiment of a content delivery system, and FIG. 2, which is a flow chart of an embodiment of a content delivery method. The system is used to deliver various electronic content items to multiple users. Examples of the electronic content items include, but are not limited to, audio content such as music, video content such as movies, computer software, documentation and other rich media content. An application server 10 hosts the various electronic content items for the users to download. The application server 10 also acts to perform content management functions.

Each of the users has one or more devices in his/her customer premise or on a network to make requests for and to receive particular content items. Examples of the devices include, but are not limited to, a personal computer, a set top box (e.g. a satellite set top box), and a mobile computing device. Examples of the network include an 802.11 network such as an 802.11a network.

Some users are capable of receiving content items via a wireline link provided by a broadband wireline network 12. The broadband wireline network 12 may comprise a digital subscriber line (DSL) network, for example. In another embodiment, the broadband wireline network 12 may also comprise a fiber to the premise or a fiber to the node network (FTTN), such as described in U.S. patent application No. 60/546,900, incorporated by reference herein. Other users are capable of receiving content items via either the broadband wireline network 12 or a wireless link provided by a wireless network 14. Examples of the wireless network 14 include, but are not limited to, a satellite network and a terrestrial wireless network such as a wireless local area network (WLAN) or an Internet protocol (IP) over radio network. For purposes of illustrating one particular embodiment, the wireless network 14 is illustrated as a satellite network.

Figure 2:
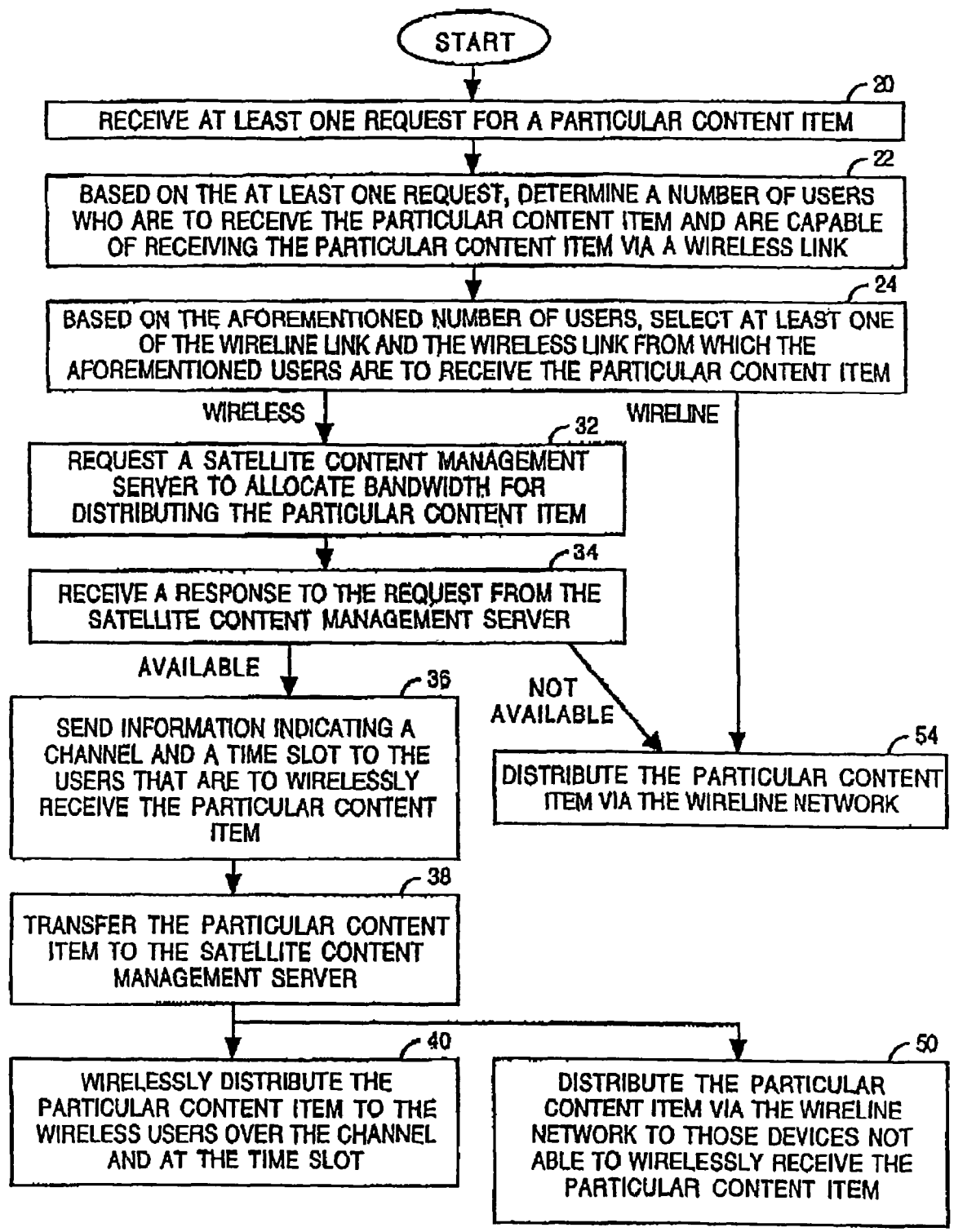
FIG. 2 is a flow chart of an embodiment of a content delivery method.

To simplify the description, the method in FIG. 2 illustrates content delivery acts for one of the content items. Those having ordinary skill should appreciate that, in practice, the method of FIG. 2 is performed for each requested content item.

As indicated by block 20, the application server 10 receives at least one request for a particular content item. Of particular interest are cases in which multiple requests for the particular content item from multiple users are received by the application server 10. The multiple requests for the same particular content item may be from several users spread over a wide geographical area. Some of the requests may be from users that are capable of receiving the particular content item via either a wireless link or a wireline link. Others of the requests may be from users that are capable of receiving the particular content item via only a wireline link.

The application server 10 stores the requests for content to be executed at a later time. The policy for executing content requests is determined by a content distributor. For example, the content requests may be executed on or after a predetermined date and time, or may be executed upon receiving at least a predetermined number of content requests for the particular content item. Thereafter, the content requests are executed as follows.

Based on the requests, the application server 10 determines a number of users who are to receive the particular content item and are capable of receiving the particular content item via a wireless link (as indicated by block 22). Based on the aforementioned number of users, the application server 10 selects at least one of the wireline link and the wireless link from which the users are to receive the particular content item (as indicated by block 24). This act may comprise comparing the aforementioned number to a preset threshold. If the aforementioned number is greater than the threshold (or is otherwise a sufficiently large number), the wireless link is selected to broadcast the particular content item to the users capable of wirelessly receiving content. If the aforementioned number is less than the threshold (or is otherwise a relatively small number), the wireline link is selected to deliver the particular content item to all of the users. In either case, the wireline link is selected to deliver the particular content item to users who do not have access to the wireless network 14.

If the wireless link is selected, and the wireless link comprises a satellite link, the application server 10 requests a satellite content management server 30 to allocate bandwidth for distributing the particular content item (as indicated by block 32). The application server 10 receives a response to the request from the satellite content management server 30 (as indicated by block 34). The response may indicate either that no bandwidth is available, or a channel and a time slot identifying a satellite link for distributing the particular content item.

If a channel and a time slot are received, an act of sending information indicating the channel and time slot to the users that are to wirelessly receive the particular content item may be performed (as indicated by block 36). Based on the information, the users' devices (e.g. a satellite receiver) can tune to the channel at the particular time slot to receive the particular content item. At an appropriate time, the application server 10 transfers the particular content item to the satellite content management server 30 via a network 37 (as indicated by block 38). The satellite content management server 30, in turn, distributes the particular content item to the users over the channel and at the time slot (as indicated by block 40). The satellite content management server 30 uses a transmit dish 42 or an alternative transmit antenna to communicate the particular content item to a satellite 44 in an uplink signal. The satellite 44, in turn, broadcasts the particular content item in the form of a downlink signal receivable by a receiving dish 46 or an alternative receiving antenna for each of the users. As indicated by block 50, the application server 10 distributes the particular content item via the wireline network 12 to those devices not able to receive the particular content item via the satellite link. In one embodiment, the wireline network 12 comprises a DSL network so that the particular content item is received by a DSL modem 52.

If the response in block 34 indicates that sufficient bandwidth is unavailable, the application server 10 may either: (a) override the selection made in block 24 and select wireline links from which the users are to receive the particular content item, (b) delay distributing the particular content item until satellite bandwidth is available, (c) send a request to another satellite content management server, or (d) send a request to another type of wireless network (e.g. a non-satellite wireless network).

If wireline links are to be used to communicate the particular content item (e.g. as a result of a small number of requests or satellite bandwidth being unavailable), the application server 10 distributes the particular content item via the wireline network 12 to the users (as indicated by block 54). In one embodiment, the wireline network 12 comprises a DSL network so that the particular content item is received by the DSL modem 52.

At the customer premise, the particular content item is received by either the receiving dish 46 or the DSL modem 52. The receiving dish 46 may communicate the particular content item to a set top box 56. The set top box 56 outputs a display signal to a display device 60 such as a television or a monitor. The display device 60 can be used to display video and/or audio content items. The DSL modem 52 can communicate video and/or audio content items to the set top box 56 to enable display thereof by the display device 60. Computer software content items can be distributed from either the DSL modem 52 or the set top box 56 to a personal computer 62. In one embodiment, the personal computer 62 is directly connected to the set top box 56. The set top box 56 can act as a server in redistributing content items within the customer premise.

Various digital rights management acts may be performed to mitigate the potential for unauthorized individuals to access (e.g. to receive and/or use) the particular content item broadcast via satellite or another wireless network. An example is distributing licenses or otherwise authorizing specific devices to receive the particular content item. This act inhibits other devices (e.g. from non-requesting users) from storing the particular content item being transmitted via satellite. Another example is distributing licenses or otherwise authorizing specific devices to play back or use the particular content item. In this case, the content vendor may use the satellite feed to pre-publish the particular content item onto many or all devices, including those from non-requesting users. Licenses are issued or distributed after the particular content item is distributed, and when the particular content item is to be used or played back after proper transactions have be completed.

The application server 10 manages and coordinates license distribution between DSL-based distribution and satellite feed distribution. For example, the application server 10 may withhold pre-delivery of the license until contacted again by the end device for which the particular content item is to be used. Then, the device may be authenticated and issued a license to use the particular content item.

The acts described herein may be directed by computer software code embodied as computer-readable data on a computer-readable medium. Examples of the computer-readable medium include, but are not limited to, a magnetic storage medium such as a magnetic disk, an optical storage medium such as an optical disk, or an electronic storage medium such as an electronic memory. Preferably, the application server 10 includes a computer processor to perform the acts based on the computer software code.

It will be apparent to those skilled in the art that the disclosed subject matter may be modified in numerous ways and may assume many embodiments other than the forms specifically set out and described herein. For example, acts performed by the application server 10 may be performed by one or more other computing devices.

Accordingly, it is intended by the appended claims to cover all modifications which fall within the true spirit and scope of the present invention.

What is claimed is:

1. A method comprising:
receiving a plurality of requests for a particular content item at an application server from a plurality of customer premise devices, wherein each request of the plurality of requests is received via a broadband wireline link from one of the plurality of customer premise devices, and wherein each of the plurality of customer premise devices is capable of receiving the particular content item via the broadband wireline link;
determining a number of the customer premise devices capable of receiving the particular content item via a satellite link;
when the determined number is greater than a preset number, transferring the particular content item from the application server to a satellite content management server to be distributed over a channel and a time slot allocated by the satellite content management server to the customer premise devices capable of receiving the particular content item via the satellite link; and when the determined number is not greater than the preset number, distributing the particular content item via the broadband wireline link from the application server to the customer premise devices capable of receiving the particular content item via the satellite link.

2. The method of claim 1, wherein the wireline link is a fiber to the node (FTTN) connection.

3. The method claim 1 further comprising sending information indicating the channel and the time slot from the application server to the customer premise devices.

4. The method of claim 1, further comprising authorizing customer premise devices to receive the particular content item, wherein said authorizing comprises distributing licenses to enable the customer premise devices to receive the particular content item.

5. The method of claim 1, further comprising authorizing customer premise devices to use the particular content item, wherein said authorizing comprises distributing licenses to enable the customer premise devices to use the particular content item.

6. A system for distributing content, the system comprising:
an application server programmed to:
receive a plurality of requests for a particular content item from a plurality of customer premise devices, wherein each request of the plurality of requests is received via a fiber to the node (FTTN) link from one of the plurality of customer premise devices, and wherein each of the plurality of customer premise devices is capable of receiving the particular content item via the FTTN link:
determine a number of the customer premise devices capable of receiving the particular content item via a satellite link in response to the request;
when the determined number is greater than a preset number, transfer the particular content item from the application server to a satellite content management server to be distributed over a channel and a time slot allocated by the satellite content management server to the customer premise devices capable of receiving the particular item via the satellite link;

when the determined number is not greater than the preset number, distributing the particular content item via the FTTN link from the application server to the customer premise devices capable of receiving the particular content item via the satellite link;

communicate the particular content item to at least one of a satellite content management server and a land line FTTN network to distribute the particular content item via the selected link to the customer premise devices capable of receiving the particular content item via the satellite link; and communicate the particular content item to the landline FTTN network to distribute the particular content item via the FTTN link to any customer premise devices not capable of receiving the particular content item via the satellite link.

7. The system of claim 6, wherein the application server is to send information indicating the channel and the time slot to the users customer premise devices.

8. The system of claim 6, wherein the application server is to authorize devices associated with users to receive the particular content item, wherein the application server authorizes the devices by distributing licenses to enable the devices associated with the users to receive the particular content item.

9. The system of claim 6, wherein the application server is to authorize devices associated with users to play back the particular content item, wherein the application server authorizes the devices by distributing licenses to enable the devices associated with the users to play back the particular content item.

10. The system of claim 9, wherein at least one of the licenses is distributed after distributing the particular content item.

11. The system of claim 6, wherein the application server is to authorize devices associated with users to use the particular content item, wherein the application server authorizes the devices by distributing licenses to enable the devices associated with the users to use the particular content item.

12. The system of claim 6, wherein the particular content item comprises computer software.

13. The system of claim 6, wherein the particular content item comprises video content.

* * * * *